US009418121B2

(12) United States Patent
Moxley et al.

(10) Patent No.: US 9,418,121 B2
(45) Date of Patent: Aug. 16, 2016

(54) SEARCH RESULTS FOR DESCRIPTIVE SEARCH QUERIES

(71) Applicant: Google Inc., Mountain View, CA (US)

(72) Inventors: Emily K. Moxley, San Francisco, CA (US); Sean Liu, El Dorado Hills, CA (US)

(73) Assignee: Google Inc., Mountain View, CA (US)

( * ) Notice: Subject to any disclaimer, the term of this patent is extended or adjusted under 35 U.S.C. 154(b) by 488 days.

(21) Appl. No.: 13/796,915

(22) Filed: Mar. 12, 2013

(65) Prior Publication Data

US 2014/0280040 A1      Sep. 18, 2014

(51) Int. Cl.
*G06F 17/30* (2006.01)

(52) U.S. Cl.
CPC .... *G06F 17/30554* (2013.01); *G06F 17/30244* (2013.01); *G06F 17/30991* (2013.01)

(58) Field of Classification Search
CPC ................... G06F 17/30637; G06F 17/30861; G06Q 30/0207
USPC .......................................... 707/722, 723, 731
See application file for complete search history.

(56) References Cited

U.S. PATENT DOCUMENTS

| 6,795,094 | B1 * | 9/2004 | Watanabe | G06F 17/30265 715/762 |
| 2007/0273518 | A1 * | 11/2007 | Lupoli | G06Q 10/08 340/572.1 |
| 2009/0276419 | A1 * | 11/2009 | Jones | G06F 17/30637 |
| 2009/0287693 | A1 * | 11/2009 | Audet | G06F 3/04815 |
| 2010/0036840 | A1 * | 2/2010 | Pitts | G06F 17/30106 707/726 |
| 2011/0307814 | A1 * | 12/2011 | Audet | G06F 3/04815 715/764 |
| 2012/0284259 | A1 * | 11/2012 | Jehuda | G06F 17/30734 707/722 |
| 2012/0296891 | A1 * | 11/2012 | Rangan | G06F 17/3069 707/722 |
| 2013/0066914 | A1 * | 3/2013 | Chetuparambil | G06Q 30/0256 707/776 |

FOREIGN PATENT DOCUMENTS

CA      2666016 A1     11/2009

OTHER PUBLICATIONS

Gwizdka, Jacek, "What a Difference a Tag Cloud Makes: Effects of Tasks and Cognitive Abilities on Search Results Interface Use," Information Research, vol. 14, No. 4, Oct. 30, 2009, pp. 1-25.*
International Preliminary Report on Patentability in International Application No. PCT/US2014/016252, mailed on Sep. 24, 2015, 9 pages.

(Continued)

*Primary Examiner* — Hosain Alam
*Assistant Examiner* — Ahmed Abraham
(74) *Attorney, Agent, or Firm* — Fish & Richardson P.C.

(57) ABSTRACT

Methods, systems, and apparatus, including computer programs encoded on computer storage media, for identifying resources responsive to a search query. One of the methods includes maintaining an index for a collection of resources, where each resource is associated with zero or more respective entity tags, and each entity tag includes a respective entity name, receiving a search query from a user device, identifying resources that satisfy the search query, determining that the search query satisfies one or more descriptive query criteria, processing each entity tag that is associated with a respective identified resource, generating a results page that includes user interface elements, each selectable by a user operating the user device to initiate an entity-specific search, and sending the results page to the user device.

17 Claims, 3 Drawing Sheets

(56) References Cited

OTHER PUBLICATIONS

Datta, Ritendra et al., "Image Retrieval: Ideas, Influences, and Trends of the New Age," ACM Computing Surveys, ACM, New York, NY, US, vol. 40, No. 2, Apr. 1, 2008, 60 pages.

Notification of Transmittal of the International Search Report and the Written Opinion of the International Searching Authority, or the Declaration issued in PCT/US2014/016252 on Apr. 22, 2014, 13 pages.

* cited by examiner

SEARCH RESULTS FOR DESCRIPTIVE SEARCH QUERIES

BACKGROUND

This specification relates to identifying resources responsive to a search query.

Search systems index resources, e.g., social network updates, microblog posts, blog posts, news feeds, user generated multimedia content, images, videos, and web pages, and present information about the indexed resources to a user in response to receipt of a particular search query.

SUMMARY

An entity is a person, place, thing or concept. A resource that includes image content of an entity can be associated with an entity tag that uniquely identifies that entity. When a search system identifies such a resource as satisfying a search query received from a user device, the search system can return to the user device a results page that includes user interface (UI) element data that, when processed by the user device, causes the user device to display a UI element that is labeled with the name of the entity. The UI element is selectable by a user operating the user device to initiate a search for other resources that are associated with the entity.

In general, one innovative aspect of the subject matter described in this specification can be embodied in methods that include the actions of maintaining an index for a collection of resources, where each resource in the collection is associated with zero or more respective entity tags, and where each entity tag includes a respective entity name, receiving a search query from a user device, identifying a plurality of resources in the collection that satisfy the search query using the index, where each identified resource includes respective image content, upon determining that the search query satisfies one or more descriptive query criteria, processing each entity tag that is associated with a respective identified resource as a current entity tag, including determining whether or not a user interface (UI) element that is representative of the current entity tag is to be displayed on the user device, and if so, generating UI element data that, when processed by the user device, causes the user device to display a UI element that is labeled with the entity name in the current entity tag and is selectable by a user operating the user device to initiate a search for resources that are associated with an entity that is identified by the entity name in the current entity tag, generating a results page that includes the UI element data, and sending the results page to the user device.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

The method can further include determining that the search query satisfies the one or more descriptive query criteria based on a result of one or more of the following: determining that the search query includes more than a first threshold number of distinct nouns that are hypernyms, determining that the search query includes more than a different, second threshold number of distinct adjectives, and determining that the plurality of resources is associated with more than a different, third threshold number of distinct entity tags.

The method of determining whether or not the UI element that is representative of the current entity tag is to be displayed on the user device can include determining whether or not the current entity tag is the only entity tag that is associated with the respective identified resource, and if so, generating the UI element data that is representative of the current entity tag.

The method of determining whether or not the UI element that is representative of the current entity tag is to be displayed on the user device can include determining whether or not entity tags identical to the current entity tag are associated with less than a threshold percentage of the identified resources, and if so, generating the UI element data that is representative of the current entity tag.

Each resource in the collection is associated with zero or more respective keyword tags. Each keyword tag includes a respective keyword. The method can further include processing each keyword tag that is associated with a respective identified resource as a current keyword tag, including determining whether or not the keyword included in the current keyword tag is an entity name, and if so, generating an entity tag that includes the keyword, and associating the entity tag with the identified resource that is associated with the current keyword tag.

The method can further include processing a first resource, determining, based on a result of the processing, that image content in the first resource includes a visual representation of a particular entity, generating an entity tag that include an entity name that identifies the particular entity, and associating the entity tag with the first resource. The method of processing the first resource can include processing text content in the first resource to identify one or more keywords, and determining that at least one of the keywords is an entity name. The method of processing the first resource can include processing metadata associated with the first resource to identify one or more keywords, and determining that at least one of the keywords is an entity name. The method of processing the first resource can include determining that features of the image content in the first resource match features of image content in a different, second resource, where the second resource is associated with an entity tag that identifies the particular entity.

Particular embodiments of the subject matter described in this specification can be implemented so as to realize one or more of the following advantages. A user can submit a descriptive search query that does not identify an entity by name and leverage information stored in an entity database to initiate an entity-specific search and/or search refinement.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
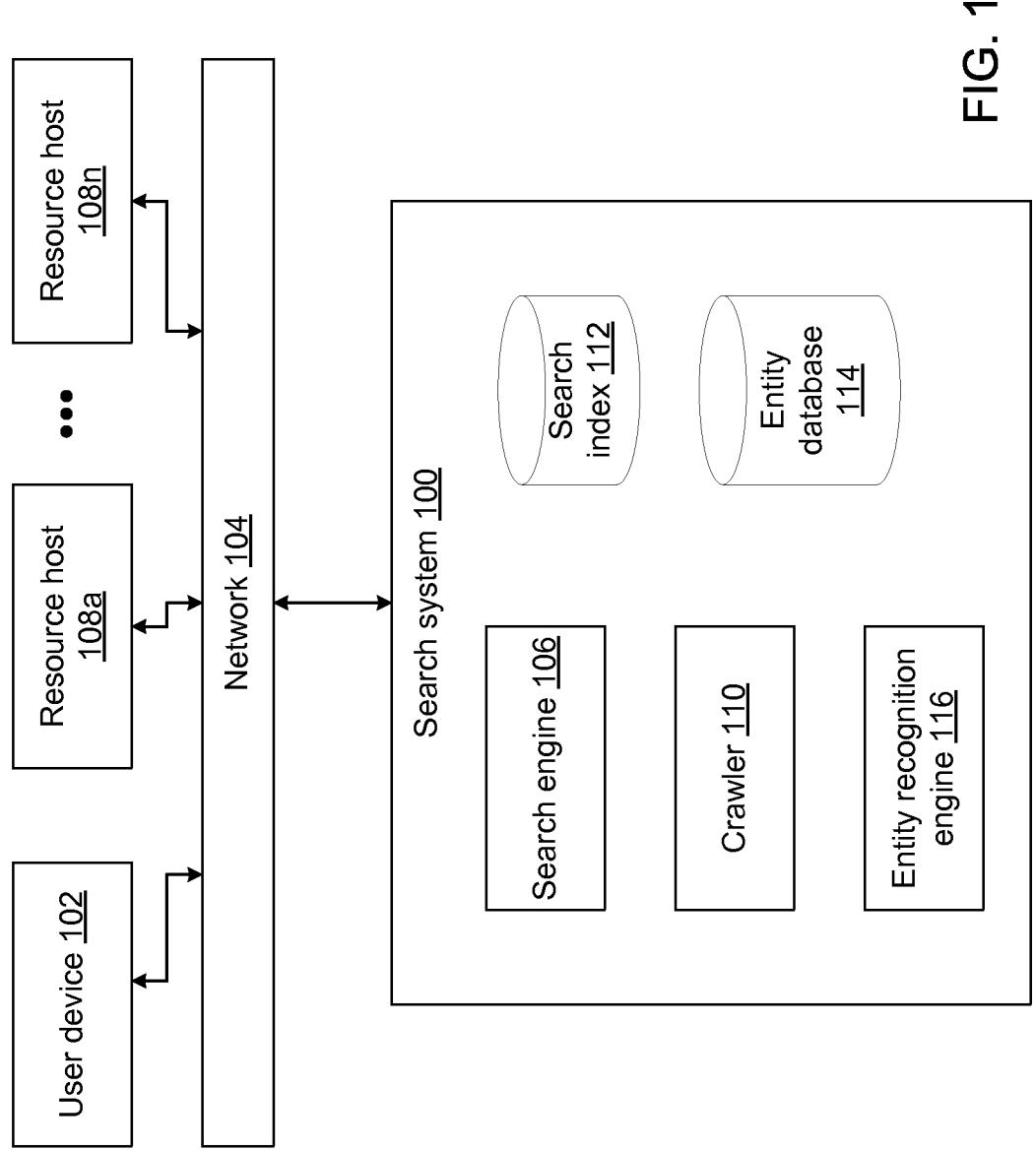
FIG. 1 shows an example search system that can receive search queries from and present search results to a user device.

FIG. 1 shows an example search system 100 that can receive search queries from and present search results to a user device 102. The user device 102 can be any digital device used by a user to access the search system 100, for example, a mobile phone or a personal computer connected to a network 104, for example, the Internet.

The search system 100 includes a search engine 106 configured to search a collection of resources and identify specific resources that satisfy the search queries. The search system 100 can communicate with multiple resource hosts 108a . . . 108n, each of which stores multiple resources within the collection of resources, over the network 104.

A resource is a digital resource that can be individually addressed, for example, using a Uniform Resource Locator (URL). A resource can include content in any format, for example, text, image, audio, video, or combinations of them. A resource can also be associated with keyword tags. In one example, a keyword tag is a tag that includes a keyword that describes the content that is included in the resource. For example, a resource that includes image content of a breed of dog known as a "Chesapeake Bay Retriever" can be associated with keyword tags that include one or more of the following user-specified keywords: "brown," "sedge," "dead grass," "tan," "light brown," "dark brown," "wooly undercoat," "thick overcoat," "short overcoat," "muscular," "swimmer," "dog," and "Chesapeake Bay Retriever."

The search system 100 includes a crawler 110 that crawls resources stored in the resource hosts 108a . . . 108n and stores information about each resource in a search index 112. The information that is stored in the search index 112 can be derived from keyword tags and metadata associated with the resources and text content in the resources.

The search system 100 also includes an entity database 114, which is a repository of information pertaining to distinct entities, for example, people, places, things, or concepts. In an example in which an entity is a thing, specifically, a breed of dog known as a "Chesapeake Bay Retriever," the entity database 114 includes information about the entity, for example, entity name: "Chesapeake Bay Retriever," place of origin: "United States of America," breed: "dog," breed group: "sporting," and color: "brown, sedge, dead grass, light brown, dark brown, tan." The entity database 114 also stores associations between entities that have a hypernym-hyponym relationship. A hyponym of a given term is a more specific term in the same domain, while a hypernym is a more general term. For example, "dog" is a hypernym of "Chesapeake Bay Retriever," and "dragon fruit" is a hyponym of "fruit." Hypernym-hyponym relationships can be determined, for example, by analyzing text corpora to identify certain syntactic patterns representative of a hypernym hyponym pair, or by consulting predefined lists of hyponyms and hypernyms.

The search system 100 also includes an entity recognition engine 116 that recognizes entities in resources that are stored on the resource hosts 108a . . . 108n. In one example, the entity recognition engine 116 implements a keyword processing technique that can determine whether any keyword included in a keyword tag that is associated with a particular resource matches an entity name in the entity database 114. If the entity recognition engine 116 finds a match, the entity recognition engine 116 generates an entity tag that includes the entity name and stores information in the entity database 114 that associates the entity tag with the particular resource. In another example, the entity recognition engine 116 uses conventional computer vision techniques to determine whether features of image content in a resource match those of a resource that is associated with an entity tag. If the entity recognition engine 116 finds a match, the entity recognition engine 116 stores information in the entity database 114 that associates the entity tag with both of the resources. In a third example, the entity recognition engine 116 processes text, e.g., metadata that is associated with the resource or text content that is included in the resource, to identify one or more keywords, then performs the keyword processing technique described above to associate the resource with one or more entity tags.

Each of the search engine 106, crawler 110, and entity recognition engine 116 is implemented in the system 120 as one or more software modules running on one or more computers in one or more locations.

Figure 2:
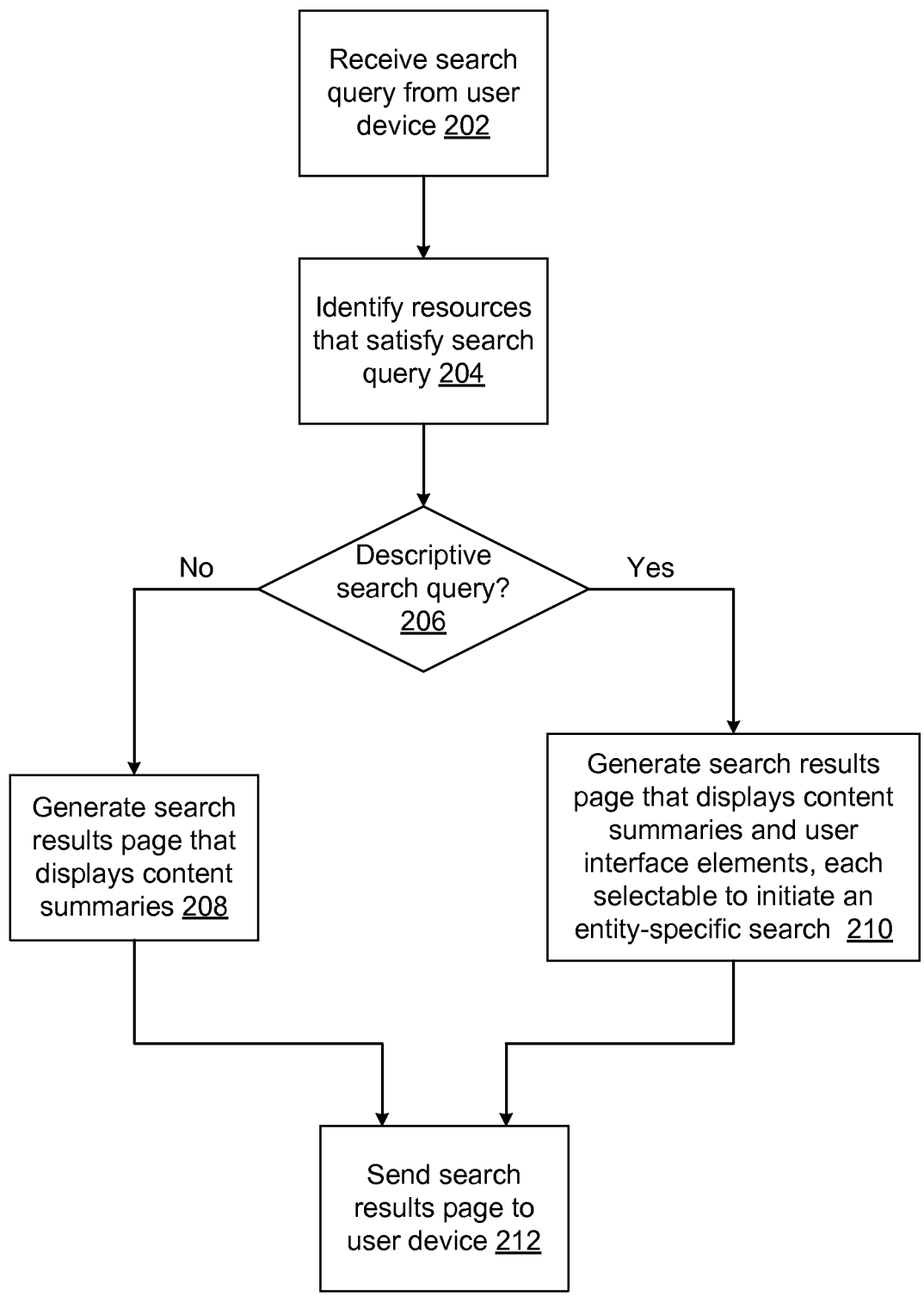
FIG. 2 is a flow chart of an example process to generate a search results page.

FIG. 2 is a flow chart of an example process to generate a search results page. Implementation of the process can occur in a data processing system using computer software that performs the operations of the process, for example, a system like search system 100.

The search system 100 receives a search query from a user device 102 (202). In one example, the search query includes the following text string: "wooly undercoat swimming brown dog" with an indication that search results returned must include images.

The search system 100 identifies resources in the collection of resources that satisfy the search query (204). Each identified resource includes image content. Each identified resource is associated with zero or more entity tags.

Next, the search system 100 determines whether or not the search query is a descriptive search query (206). In one implementation, the search system 100 makes this determination by evaluating the search query according to one or more descriptive query criteria. In one example, the search system 100 identifies the search query as descriptive if the search query includes more than a threshold number of distinct nouns that are hypernyms. In another example, the search system 100 identifies the search query as descriptive if the search query includes more than a threshold number of adjectives. In another example, the search system 100 identifies a search query as descriptive if more than a threshold number of distinct entity tags are associated with the resources identified as satisfying the search query. The search system 100 can use additional or different criteria to determine whether a particular search query is descriptive.

If the search system 100 determines that the search query is not a descriptive search query, the search system 100 uses conventional techniques to generate a search results page that, when processed by the user device 102, displays summaries of content from the identified resources (208). In one example, a summary of content from an identified resource includes the image content included in the identified resource and a link to the resource itself.

If, however, the search system 100 determines that the search query is descriptive, the search system 100 generates a search results page that includes summaries of content from the identified resources and user interface elements that a user operating the user device 102 selects in order to initiate entity-specific searches (210).

In some implementations, upon determining that the search query is descriptive, the search system 100 processes each entity tag associated with an identified resource as a current entity tag in order to determine whether or not a user interface (UI) element representative of the current entity tag is to display on the user device 102 in conjunction with the image content of the associated identified resource. Four example techniques for making this determination are described below with reference to a receipt, by the search system 100, of the "wooly undercoat swimming brown dog" search query.

In a first example, the search system 100 generates UI element data that is representative of the current entity tag if the current entity tag is the only entity tag that is associated with a particular identified resource. Suppose, in step 204, the search system 100 identifies a resource associated with a single entity tag that includes a text string of "Chesapeake Bay Retriever" as satisfying the "wooly undercoat swimming brown dog" search query. In step 210, the search system 100 generates UI element data that, when processed by the user device 102, causes a UI element, labeled with "Chesapeake Bay Retriever" to display. A user operating the user device 102 may select this UI element to initiate a search that is specific to the entity identified by the name of "Chesapeake Bay Retriever."

In a second example, the search system 100 generates UI element data that is representative of the current entity tag if entity tags identical to the current entity tag are associated with less than a threshold percentage of the identified resources. Suppose, in step 204, the search system 100 identifies 3000 resources as satisfying the "wooly undercoat swimming brown dog" search query, of which 2900 are associated with the entity tag that includes a text string of "dog" and of those 2900 resources, 500 are further associated with an entity tag that includes a text string of "Chesapeake Bay Retriever." If the threshold percentage is set at 20%, the search system 100 does not generate UI element data that is representative of a current entity tag of "dog" but does generate UI element data that is representative of a current entity tag of "Chesapeake Bay Retriever." In addition, if 50 of those 500 resources are further associated with an entity tag that includes a text string of "Alaskan Malamute," the search system 100 can generate UI element data that causes a UI element labeled with "Also in this image is an Alaskan Malamute" to display when the user device 102 processes the UI element data.

In a third example in which an identified resource is associated with two or more entity tags that share a subordinate/dominant relationship, the search system 100 generates UI element data only for the subordinate entity tag. For example, an identified resource is associated with multiple entity tags, of which one includes a text string of "dog" and another includes a text string of "Chesapeake Bay Retriever." Information in the entity database 114 indicates that the entity of "Chesapeake Bay Retriever" is subordinate to the entity of "dog." In the above example, when the search system 100 processes the entity tags of "dog" and "Chesapeake Bay Retriever," the search system 100 generates UI element data that causes a UI element labeled with "Chesapeake Bay Retriever" to display but does not cause a UI element labeled with "dog" to display when the user device 102 processes the UI element data.

In a fourth example, the search system 100 generates UI element data that is representative of the current entity tag if less than a threshold number of entity tags are associated with the particular identified resource. If, for example, the threshold number is set at four, then for identified resources associated with one, two, or three entity tags, the search system 100 generates UI element data that causes a respective UI element to display for each of the entity tags associated with the particular identified resource when the user device 102 processes the UI element data.

For those identified resources that are associated with more than the above threshold number of entity tags, the search system 100 can use a tag diversity technique to select a predefined number of entity tags of each entity type, for which corresponding UI element data is generated. For example, an identified resource is associated with a first entity tag that includes a text string of "Chesapeake Bay Retriever," a second entity tag that includes a text string of "Cypress tree," a third entity tag that includes a text string of "Point Lobos," a fourth entity tag that includes a text string of "Carmel Bay," and a fifth entity tag that includes a text string of "Monterrey Peninsula." The search system 100 examines the information in the entity database 114 for these five tags and determines that the first two entity tags represent things and the remaining three entity tags represent places. In the above example, the search system 100 generates UI element data that causes a UI element labeled "Chesapeake Bay Retriever" and a UI element labeled "Point Lobos" to display when the user device 102 processes the UI element data.

The search system 100 transmits the search results page to the user device 104 (212).

Figure 3:
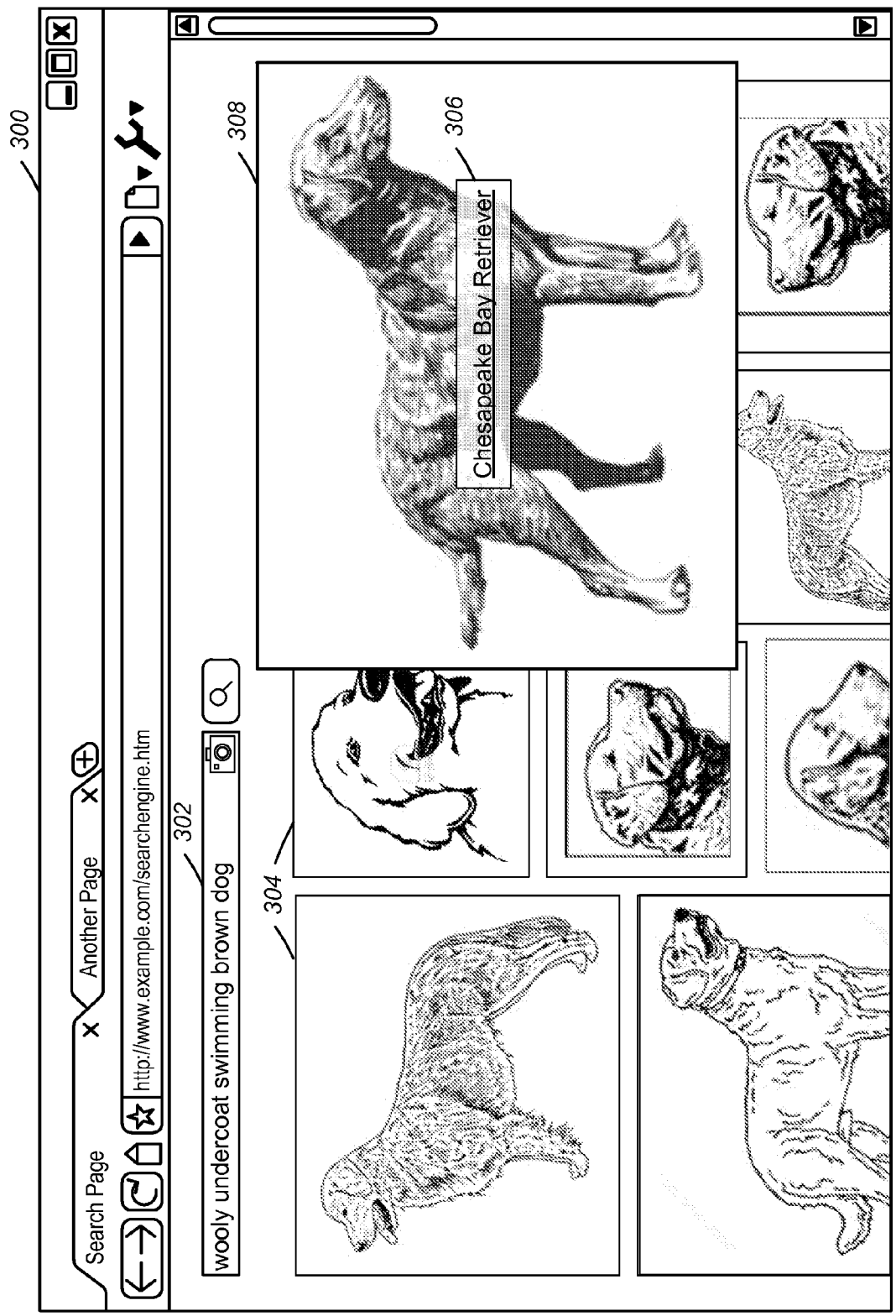
FIG. 3 illustrates an example web page of image search results.

FIG. 3 illustrates an example web page 300 of image search results. The web page 300 includes a query of "wooly undercoat swimming brown dog" entered into a search text field 302 and image search results 304, 306, 308 that satisfy the query. Using the process described in FIG. 2, the UI element 306, labeled with "Chesapeake Bay Retriever," can be displayed to a user, for example, when the user hovers a cursor over the image search result 308. The user can select this UI element 318 to initiate a search that is specific to the entity identified by the name of "Chesapeake Bay Retriever."

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Although the examples above describe embodiments of the subject matter in the context of a receipt of a descriptive search query, the techniques can also be applied to generate a results page that surfaces user interface elements in response to receipt of a non-descriptive search query.

What is claimed is:

1. A computer-implemented method comprising:
maintaining an index for a collection of resources, wherein each resource in the collection is associated with zero or more respective entity tags, and wherein each entity tag includes a respective entity name;
receiving a search query from a user device;
identifying a plurality of resources in the collection that satisfy the search query using the index;
determining that (i) the search query includes more than a first threshold number of distinct nouns that are hypernyms, (ii) the search query includes more than a different, second threshold number of distinct adjectives, or (iii) the plurality of resources is associated with more than a different, third threshold number of distinct entity tags;
in response to determining that (i) the search query includes more than a first threshold number of distinct nouns that are hypernyms, (ii) the search query includes more than a different, second threshold number of distinct adjectives, or (iii) the plurality of resources is associated with more than a different, third threshold number of distinct entity tags, processing each entity tag that is associated with a respective identified resource as a current entity tag, including:
determining whether or not a user interface (UI) element that is representative of the current entity tag is to be displayed on the user device; and
in response to determining that the UI element that is representative of the current entity tag is to be displayed on the user device, generating UI element data that, when processed by the user device, causes the user device to display a UI element that is labeled with the entity name in the current entity tag and is selectable by a user operating the user device to initiate a search for resources that are associated with an entity that is identified by the entity name in the current entity tag;
generating a results page that includes the UI element data; and
sending the results page to the user device.

2. The computer-implemented method of claim 1, wherein determining whether or not the UI element that is representative of the current entity tag is to be displayed on the user device comprises:
determining whether or not the current entity tag is the only entity tag that is associated with the respective identified resource, and if so, generating the UI element data that is representative of the current entity tag.

3. The computer-implemented method of claim 1, wherein determining whether or not the UI element that is representative of the current entity tag is to be displayed on the user device comprises:
determining whether or not entity tags identical to the current entity tag are associated with less than a threshold percentage of the identified resources, and if so, generating the UI element data that is representative of the current entity tag.

4. The computer-implemented method of claim 1, wherein each resource in the collection is associated with zero or more respective keyword tags, wherein each keyword tag includes a respective keyword, and wherein the method further comprises:
processing each keyword tag that is associated with a respective identified resource as a current keyword tag, including:
determining whether or not the keyword included in the current keyword tag is an entity name, and if so, generating an entity tag that includes the keyword; and
associating the entity tag with the identified resource that is associated with the current keyword tag.

5. The computer-implemented method of claim 1, further comprising:
processing a first resource;
determining, based on a result of the processing, that image content in the first resource includes a visual representation of a particular entity;
generating an entity tag that include an entity name that identifies the particular entity; and
associating the entity tag with the first resource.

6. The computer-implemented method of claim 5, wherein processing the first resource comprises:
processing text content in the first resource to identify one or more keywords; and
determining that at least one of the keywords is an entity name.

7. The computer-implemented method of claim 5, wherein processing the first resource comprises:
processing metadata associated with the first resource to identify one or more keywords; and
determining that at least one of the keywords is an entity name.

8. The computer-implemented method of claim 5, wherein processing the first resource comprises:
determining that features of the image content in the first resource match features of image content in a different, second resource, wherein the second resource is associated with an entity tag that identifies the particular entity.

9. A non-transitory computer-readable storage medium storing instruction that, when executed by one or more computers, cause the one or more computers to perform a method comprising:
maintaining an index for a collection of resources, wherein each resource in the collection is associated with zero or more respective entity tags, and wherein each entity tag includes a respective entity name;
receiving a search query from a user device;
identifying a plurality of resources in the collection that satisfy the search query using the index;
determining that (i) the search query includes more than a first threshold number of distinct nouns that are hypernyms, (ii) the search query includes more than a different, second threshold number of distinct adjectives, or (iii) the plurality of resources is associated with more than a different, third threshold number of distinct entity tags;
in response to determining that (i) the search query includes more than a first threshold number of distinct nouns that are hypernyms, (ii) the search query includes more than a different, second threshold number of distinct adjectives, or (iii) the plurality of resources is associated with more than a different, third threshold number of distinct entity tags, processing each entity tag that is associated with a respective identified resource as a current entity tag, including:
determining whether or not a user interface (UI) element that is representative of the current entity tag is to be displayed on the user device; and
in response to determining that the UI element that is representative of the current entity tag is to be displayed on the user device, generating UI element data that, when processed by the user device, causes the user device to display a UI element that is labeled with the entity name in the current entity tag and is selectable by a user operating the user device to initiate a search for resources that are associated with an entity that is identified by the entity name in the current entity tag;

generating a results page that includes the UI element data; and sending the results page to the user device.

10. The non-transitory computer-readable storage medium of claim 9, wherein determining whether or not the UI element that is representative of the current entity tag is to be displayed on the user device comprises:

determining whether or not the current entity tag is the only entity tag that is associated with the respective identified resource, and if so, generating the UI element data that is representative of the current entity tag.

11. The non-transitory computer-readable storage medium of claim 9, wherein determining whether or not the UI element that is representative of the current entity tag is to be displayed on the user device comprises:

determining whether or not entity tags identical to the current entity tag are associated with less than a threshold percentage of the identified resources, and if so, generating the UI element data that is representative of the current entity tag.

12. The non-transitory computer-readable storage medium of claim 9, wherein each resource in the collection is associated with zero or more respective keyword tags, wherein each keyword tag includes a respective keyword, and wherein the method further comprises:

processing each keyword tag that is associated with a respective identified resource as a current keyword tag, including:

determining whether or not the keyword included in the current keyword tag is an entity name, and if so, generating an entity tag that includes the keyword; and associating the entity tag with the identified resource that is associated with the current keyword tag.

13. The non-transitory computer-readable storage medium of claim 9, wherein the method further comprises:

processing a first resource;

determining, based on a result of the processing, that image content in the first resource includes a visual representation of a particular entity;

generating an entity tag that include an entity name that identifies the particular entity; and associating the entity tag with the first resource.

14. A system comprising:

one or more computers;

a computer-readable storage medium storing instructions that, when executed by the one or more computers, cause the one or more computers to perform a method comprising:

maintaining an index for a collection of resources, wherein each resource in the collection is associated with zero or more respective entity tags, and wherein each entity tag includes a respective entity name;

receiving a search query from a user device;

identifying a plurality of resources in the collection that satisfy the search query using the index;

determining that (i) the search query includes more than a first threshold number of distinct nouns that are hypernyms, (ii) the search query includes more than a different, second threshold number of distinct adjectives, or (iii) the plurality of resources is associated with more than a different, third threshold number of distinct entity tags;

in response to determining that (i) the search query includes more than a first threshold number of distinct nouns that are hypernyms, (ii) the search query includes more than a different, second threshold number of distinct adjectives, or (iii) the plurality of resources is associated with more than a different, third threshold number of distinct entity tags, processing each entity tag that is associated with a respective identified resource as a current entity tag, including:

determining whether or not a user interface (UI) element that is representative of the current entity tag is to be displayed on the user device; and in response to determining that the UI element that is representative of the current entity tag is to be displayed on the user device, generating UI element data that, when processed by the user device, causes the user device to display a UI element that is labeled with the entity name in the current entity tag and is selectable by a user operating the user device to initiate a search for resources that are associated with an entity that is identified by the entity name in the current entity tag;

generating a results page that includes the UI element data; and sending the results page to the user device.

15. The system of claim 14, wherein determining whether or not the UI element that is representative of the current entity tag is to be displayed on the user device comprises:

determining whether or not the current entity tag is the only entity tag that is associated with the respective identified resource, and if so, generating the UI element data that is representative of the current entity tag.

16. The system of claim 14, wherein determining whether or not the UI element that is representative of the current entity tag is to be displayed on the user device comprises:

determining whether or not entity tags identical to the current entity tag are associated with less than a threshold percentage of the identified resources, and if so, generating the UI element data that is representative of the current entity tag.

17. The system of claim 14, wherein each resource in the collection is associated with zero or more respective keyword tags, wherein each keyword tag includes a respective keyword, and wherein the method further comprises:

processing each keyword tag that is associated with a respective identified resource as a current keyword tag, including:

determining whether or not the keyword included in the current keyword tag is an entity name, and if so, generating an entity tag that includes the keyword; and associating the entity tag with the identified resource that is associated with the current keyword tag.

* * * * *